US 6,637,651 B1

(12) United States Patent
Kohl

(10) Patent No.: US 6,637,651 B1
(45) Date of Patent: Oct. 28, 2003

(54) NUMBERED GARMENT NATIONAL/ INTERNATIONAL MATCHING GAME

(76) Inventor: Marian Kohl, 3007 Skyway Cir. North, Irving, TX (US) 75038

( * ) Notice: Subject to any disclaimer, the term of this patent is extended or adjusted under 35 U.S.C. 154(b) by 0 days.

(21) Appl. No.: 09/695,406

(22) Filed: Oct. 25, 2000

Related U.S. Application Data

(60) Provisional application No. 60/212,828, filed on Jun. 21, 2000.

(51) Int. Cl.$^7$ ................................................ G06F 17/60
(52) U.S. Cl. ........................ 235/385; 235/375; 235/383
(58) Field of Search ................................ 235/375, 385, 235/487; 273/459; 40/299.01; 2/69, 77, 2–6; 705/9, 1

(56) References Cited

U.S. PATENT DOCUMENTS

| | | | | |
|---|---|---|---|---|
| 3,775,775 A | * | 12/1973 | Mazzenga | 2/80 |
| 4,773,643 A | | 9/1988 | Mizunuma | 273/445 |
| 5,697,618 A | * | 12/1997 | Schlichting | 273/459 |
| 5,794,213 A | * | 8/1998 | Markman | 705/23 |
| 5,906,369 A | | 5/1999 | Brennan et al. | 273/238 |
| 6,000,608 A | * | 12/1999 | Dorf | 235/375 |
| 6,052,122 A | * | 4/2000 | Sutcliffe et al. | 345/751 |
| 6,074,299 A | * | 6/2000 | Cohen | 413/9 |
| 6,112,186 A | * | 8/2000 | Bergh et al. | 705/10 |
| 6,279,170 B1 | * | 8/2001 | Chu | 2/246 |

FOREIGN PATENT DOCUMENTS

| | | | |
|---|---|---|---|
| CA | 2261498 A | * | 9/2000 |
| PT | 87088 A | * | 11/1989 |

OTHER PUBLICATIONS

Web site "studyspanish.com/game/clothmanmatch.html", 1999.
Web site "www.thathomesite.com", LaVelle's Originals, 1998.

* cited by examiner

*Primary Examiner*—Michael G. Lee
*Assistant Examiner*—Ahshik Kim
(74) *Attorney, Agent, or Firm*—Nixon & Vanderhye PC

(57) ABSTRACT

A simple product labeling system is used to facilitate playing a matching game over a global computer network, or the like. A plurality of substantially identical products are provided, at least two of the products, but less than all of the products, having unique matching indicia. In a preferred embodiment the at least two products having unique matching indicia consist of only two products, and there is provided a plurality of the substantially identical products in sets of two products having unique matching indicia, with the unique matching indicia differing from set to set. Most desirably, the two products having unique matching indicia comprise garments (such as T-shirts). Desirably, one of the two garments having unique matching indicia has additional female-indicating indicia while the other of the two garments has additional male-indicating indicia. Also, the two garments with unique matching indicia have common theme indicia associated with them that relates to a personality trait, personal interest, or job of potential selectors of the products. The products are used to play a matching game in which purchasers in remote geographic locations of the products with common unique indicia use web site and password indicia associated with the products to locate each other over a global computer network.

14 Claims, 1 Drawing Sheet

NUMBERED GARMENT NATIONAL/ INTERNATIONAL MATCHING GAME

CROSS-REFERENCE TO RELATED APPLICATION

This application is based upon provisional application Ser. No. 60/212,828 filed Jun. 21, 2000.

BACKGROUND AND SUMMARY OF THE INVENTION

The invention relates to at least two products having matching unique indicia, and the utilization of those products in a manner that is fun and intriguing and/or can establish personal relationships.

People everywhere around the globe love ways to reach others whom they have never met before in fun and fateful ways. That is why chat rooms on the Internet have become so popular. It is a chance for the world to be connected by a common thread. The invention utilizes this concept, but it brings with it a sense of intrigue and excitement.

According to the broadest aspect of the present invention there are provided at least two products having unique matching indicia. There can be only two products with that unique matching indicia, one product designated as a female product and the other as a male product. The unique matching indicia may comprise alpha numeric indicia, and also the product may have theme indicia associated therewith. The theme indicia would relate to an element of personality, interest, or other personal attribute so that two or more individuals finding products with the matching unique indicia would likely have certain elements in common. While in the preferred embodiment there are only two products having the unique matching indicia, in other embodiments there may be a plurality of products with the unique matching indicia, and perhaps only two, or a smaller number than the plurality, of the products have other even more specific indicia.

The invention also relates to a method of utilizing products as set forth above by offering the products for sale in different geographic locations. The geographic locations can be predetermined in advance, such as in the same city or county, in the same state, in a country as a whole, or worldwide. Alternatively the products may be shipped free of charge as part of a promotion of other goods or services, or as part of a charitable endeavor, research project, or the like.

While the product will be described below with respect to a garment, it is to be understood that almost any product may be utilized in the practice of the invention, although desirably it is a product that would have a personal meaning, recognition, or appeal such as automobiles, or unisex jewelry.

According to one aspect of the present invention the product is a garment like a T-shirt, sold at a store that is present all over America or the world (like The Gap). There are a plurality (e.g. five or so) different colors (or other distinguishing features such as embroidery, stripes, patches, etc.) of the same garment that each has a different meaning related to a personality trait (or personal interest, job, etc.). For example:

Orange—crazy
White—simple
Red—passionate
Blue—easy-going
Green—mysterious

Also, there is a number (indicia) on the clothing item. Each number (indicia) would only be printed in a limited amount. It could be that only two garments would be printed with the same number on it, or possibly there could be the same number printed on each of the five or six colors of the clothing item, or on a whole range of sizes of the same color (e.g. S, M, L, XL). One garment is labeled "F" or the like for female and one is labeled "M" or the like for male. These clothing items are sent to stores all over, and then a male or female would buy one. The next step is to find the other person/people with the same number (matching unique indicia), e.g. as part of a singles matching game.

For example, web sites could be used to find the other person with the same number, and people would be compelled to buy the garments just because it could lead them to that certain someone that they have been looking for. The way the web site works is simple. On a tag of the purchased clothing item there is a web site address and a special log-in number. When one goes to the web site, she or he types in her or his number and all of the information about her or him (i.e. name, address, e-mail, etc.). Then the computer will search for the other person/people with the matching number. If found, their e-mail address will be sent to the purchaser. If not found, a box will appear that says "try again next week", or possibly it will say "When your match has been found an e-mail will notify you."

Another form the method of utilization could take is a chat room on the web site. Certain personality colors could meet to chat, or people between certain number categories could be grouped together. Anything could be done to try to bring people closer together. It would be seen more as a "global-village-meeting-people" game than a dating game because of the potential age differences of the consumers.

According to another aspect of the invention there is provided a plurality of substantially identical products, at least two of the products, but less than all of the products, having unique matching indicia. The term 'substantially identical" means that the products are of the same type, construction, and basic style, but they may differ in size and/or in features that make them more attractive to male and female users. In a preferred embodiment the at least two products having unique matching indicia consist of only two products, and there is provided a plurality of the substantially identical products in sets of two products having unique matching indicia, with the unique matching indicia differing from set to set. Most desirably, the two products having unique matching indicia comprise garments (such as T-shirts) which have the same or a predetermined different size.

Desirably, one of the two garments having unique matching indicia has additional female-indicating indicia while the other of the two garments has additional male-indicating indicia. Also, the two garments with unique matching indicia have common theme indicia associated therewith that relates to a personality trait, personal interest, or job of potential selectors of the products; for example the common theme indicia comprises a common color, and wherein a plurality of the substantially identical products aside from the two garments with unique matching indicia also have the common color. For example the colors may relate to personality traits, and include orange, white, red, blue, and green.

To facilitate the purchaser or other securer of one of the two products (e. g. garments) of the set locating the other, there preferably also is web site and password indicia associated with each of the garments so that holders of the garments with unique common indicia may locate each other using a global computer network. The web site and password indicia may be provided on a hang tag, with or without a confidentiality cover, attached to both of the garments, and the indicia associated with the hang tag or garment must be read at a store purchasing area in order to activate the password. Typically, one of each set of products with unique matching indicia is located in a retail store geographically remote from the other of each set of products.

According to another aspect of the present invention, there is provided a matching game comprising: a) delivering at least two products with unique matching indicia to various remote geographic locations and making the products available for purchase or other acquisition at those locations; and b) providing a mechanism to allow purchasers or other securers of the products with unique matching indicia to locate each other. In the method preferably b) is practiced by associating with the products web site indicia for a global computer network, and password indicia, and the method may further comprise c) activating the password indicia for use at the time or purchase or other securing of the products.

In the matching game a) may be practiced by delivering as the at least two products only two products having unique matching indicia in a plurality of sets of only two products having unique matching indicia, the unique matching indicia differing from set to set. Also, a) may be further practiced by delivering one of the two products (e. g. garments) of each set having unique matching indicia with additional female-indicating indicia while the other of the two products of each set has additional male-indicating indicia, and a) may also be further practiced by delivering as the products of each set products that have common theme indicia associated therewith that relates to a personality trait, personal interest, or job of potential purchasers or other selectors of the products.

It is the primary object of the present invention to provide a simple product labeling system that may be used to play a matching game over a global computer network, or the like. This and other objects of the invention will become clear from an inspection of the detailed description of the invention, and from the appended claims.

BRIEF DESCRIPTION OF THE DRAWINGS

FIGS. 1 and 2 are front and rear views, respectively, of a T-shirt while FIG. 3 is a perspective view of a hang tag for use with the T-shirt of FIGS. 1 and 2.

DETAILED DESCRIPTION OF THE DRAWINGS

Figure 1:
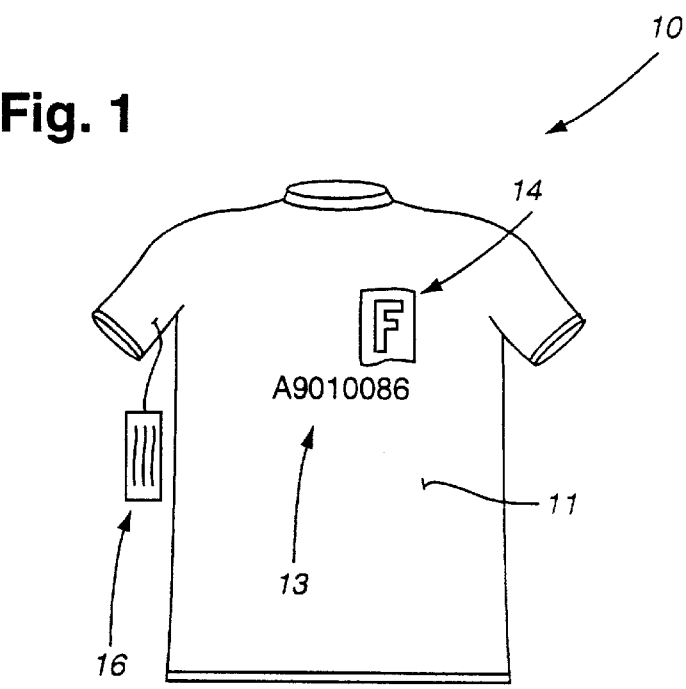
FIGS. 1 through 3 schematically illustrate one exemplary (only) form that the product according to the invention could take.
Figure 2:
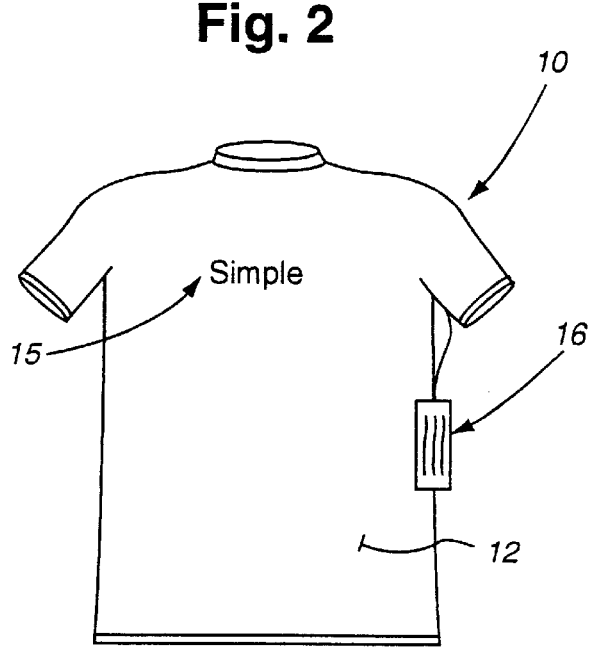

The T-shirt 10 has a front 11 (FIG. 1) and a back 12 (FIG. 2). On one of the faces, e.g. the front 11 as illustrated in FIG. 1, is unique alpha numeric indicia that has only one match, or a controlled number of matches. The garment 10 also has a designation 14 indicating whether it is for a male or a female, a female designation being shown at 14 in FIG. 1. The T-shirt 10 is of a predetermined color which matches a theme of personality, personal interest, or the like. For example the T-shirt 10 is white in color, and the personality theme corresponding to that color may be imaged, embroidered, or otherwise provided on the back 12 of the T-shirt 10, as indicated schematically at 15 in FIG. 2.

Also the T-shirt 10 may have information about the matching game associated therewith. While this indicia may be provided right on or in the T-shirt 10 itself (like the alpha numeric unique indicia 13), preferably it is provided on a hang tag 16, or in a sealed packet, that is given to the purchaser only once the T-shirt 10 has actually been purchased; or the hang tag 16 may have a conventional tamper-proof covering (e.g. envelope) that one has to remove to gain access to matching game indicia associated therewith. Also the hang tag 16 may have bar coding 17 (see FIG. 3) or the like that is machine readable and must be activated by a clerk at a checkout counter (e.g. by a machine reading the bar code 17) before the password 19 is utilizable.

Figure 3:
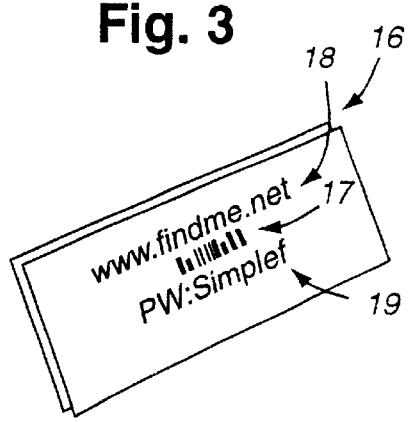

For example in the exemplary embodiment of the hang tag 16 illustrated in FIG. 3, there is a web site address 18, and a password 19. The purchaser of the garment 10 uses the web site address 18 to access the appropriate site on the Internet, then types in the password 19 to initiate the matching game which may be as described above, or may have any number of permutations or modifications.

The matching game as described above could be further enhanced by combining other games with it (such as a treasure hunt where certain individuals within a group with common indicia locate other products from a list, such as CDs, videotapes, or the like, and then match the products selected with other individuals in the group), and almost any products could be utilized, but particularly those having some particular personal association, such as unisex jewelry, cars, etc., although relatively inexpensive items are preferred.

The invention is to be accorded the broadest interpretation possible consistent with the prior art. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A line of clothing comprising:

a plurality of substantially identical garments, at least two of said garments, but less than all of said garments, having unique matching indicia;

said at least two garments having matching indicia comprising a set, and wherein said plurality of substantially identical garments are in sets of at least two garments having unique matching indicia, said unique matching indicia differing from set to set;

said at least two garments with unique matching indicia have common theme indicia associated therewith that relates to a personality trait, personal interest, or job of potential selectors of the garments;

web site and password indicia associated with each of said garments so that holders of said garments with unique common indicia may locate each other using a global computer network; and said web site and password indicia being provided on a hang tag, with or without a confidentiality cover, attached to both of said garments.

2. A line of clothing as recited in claim 1 wherein said at least two garments having unique matching indicia comprise garments which have the same or a predetermined different size.

3. A line of clothing as recited in claim 2 wherein said garments are T-shirts.

4. A line of clothing as recited in claim 2 wherein one said at least two garments having unique matching indicia has additional female-indicating indicia while the other of said two garments has additional male-indicating indicia.

5. A line of clothing garments as recited in claim 1 wherein said common theme indicia comprises a common color, and wherein a plurality of said substantially identical products aside from said at least two garments with unique matching indicia also have said common color.

6. A line of clothing garments as recited in claim 1 wherein indicia associated with said hang tag or said at least two garments must be read at a store purchasing area in order to activate said password.

7. A line of clothing as recited in claim 1 wherein one of each set of garments with unique matching indicia is located in a retail store geographically remote from the other of each set of products.

8. A line of clothing in a matching game comprising:

a plurality of substantially identical garments, at least two of said garments, but less than all of said garments, having unique matching indicia;

said at least two garments having matching indicia comprising a set, and wherein said plurality of substantially identical garments are in sets of at least two garments having unique matching indicia, said unique matching indicia differing from set to set;

said at least two garments with unique matching indicia have common theme indicia associated therewith that relates to a personality trait, personal interest, or job of potential selectors of the garments, said common theme indicia comprising a common color, and wherein said plurality of substantially identical garments aside from said at least two garments with unique matching indicia also have said common color; and web site and password indicia being associated with each of said garments so that holders of said garments with unique common indicia may locate each other using a global computer network.

9. A line of clothing as recited in claim 8 wherein said web site and password indicia is provided on a hang tag, with or without a confidentiality cover, attached to said at least two garments.

10. A line of clothing as recited in claim 8 wherein indicia associated with said products must be read at store purchasing area in order to activate said password.

11. A line of clothing as recited in claim 8 wherein said at least two garments having unique matching indicia comprising garments which have the same or a predetermined different size.

12. A line of clothing as recited in claim 11 wherein said garments are T-shirts.

13. A line of clothing as recited in claim 11 wherein one of said at least two garments having unique matching indicia has additional female-indicating indicia while the other of said two garment has additional male-indicating indicia.

14. A line of clothing as recited in claim 8 wherein said common color can include orange, white, red, blue and green.

* * * * *